(No Model.) 8 Sheets—Sheet 3.
W. & S. MOLTRUP.
MILLING MACHINE.

No. 557,594. Patented Apr. 7, 1896.

Witnesses
Jno G Hinkel
AN Dobson

Inventors
William Moltrup
Stephen Moltrup
By Foster Freeman
Attorneys (No Model.) 8 Sheets—Sheet 6.

W. & S. MOLTRUP.
MILLING MACHINE.

No. 557,594. Patented Apr. 7, 1896.

Witnesses
Inventors
William Moltrup
Stephen Moltrup
by Foster Freeman
Attorneys (No Model.) 8 Sheets—Sheet 7.
W. & S. MOLTRUP.
MILLING MACHINE.

No. 557,594. Patented Apr. 7, 1896.

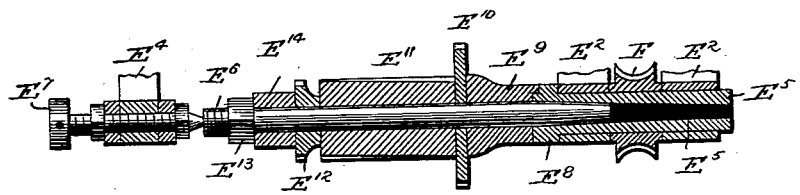
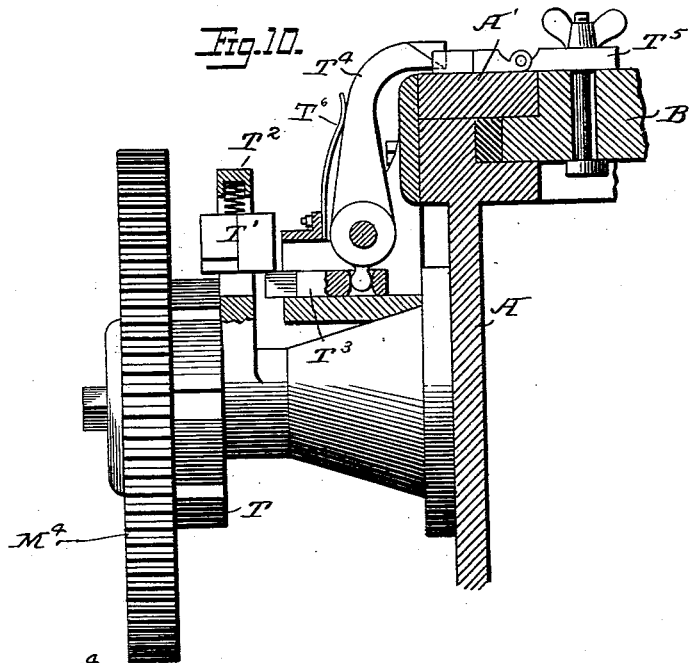
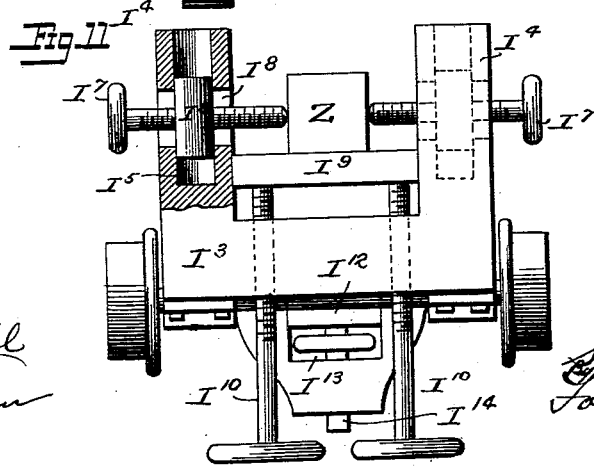

UNITED STATES PATENT OFFICE.

WILLIAM MOLTRUP AND STEPHEN MOLTRUP, OF BEAVER FALLS, PENNSYLVANIA, ASSIGNORS TO THE STANDARD GAUGE STEEL COMPANY, OF SAME PLACE.

MILLING-MACHINE.

SPECIFICATION forming part of Letters Patent No. 557,594, dated April 7, 1896.

Application filed December 17, 1892. Serial No. 456,444. (No model.)

*To all whom it may concern:*

Be it known that we, WILLIAM MOLTRUP and STEPHEN MOLTRUP, citizens of the United States, residing at Beaver Falls, Beaver county, and State of Pennsylvania, have invented certain new and useful Improvements in Milling-Machines, of which the following is a specification.

Our invention relates to milling-machines, and while the various features of the invention in whole or in part may be applied to milling-machines and the like adapted for many and various uses we have shown our invention as embodied in a machine adapted especially to the manufacture of keys, gibs, &c.

The objects of our invention are to improve the various parts of the milling-machine, and to provide an organized machine, which shall be automatic and rapid in its operation, and which shall be adjustable and capable of various uses either in whole or in part.

To these ends our invention consists in the various features of construction, arrangement, and mode of operation of the parts and of the machine as a whole, substantially as hereinafter more particularly pointed out.

Figure 1:
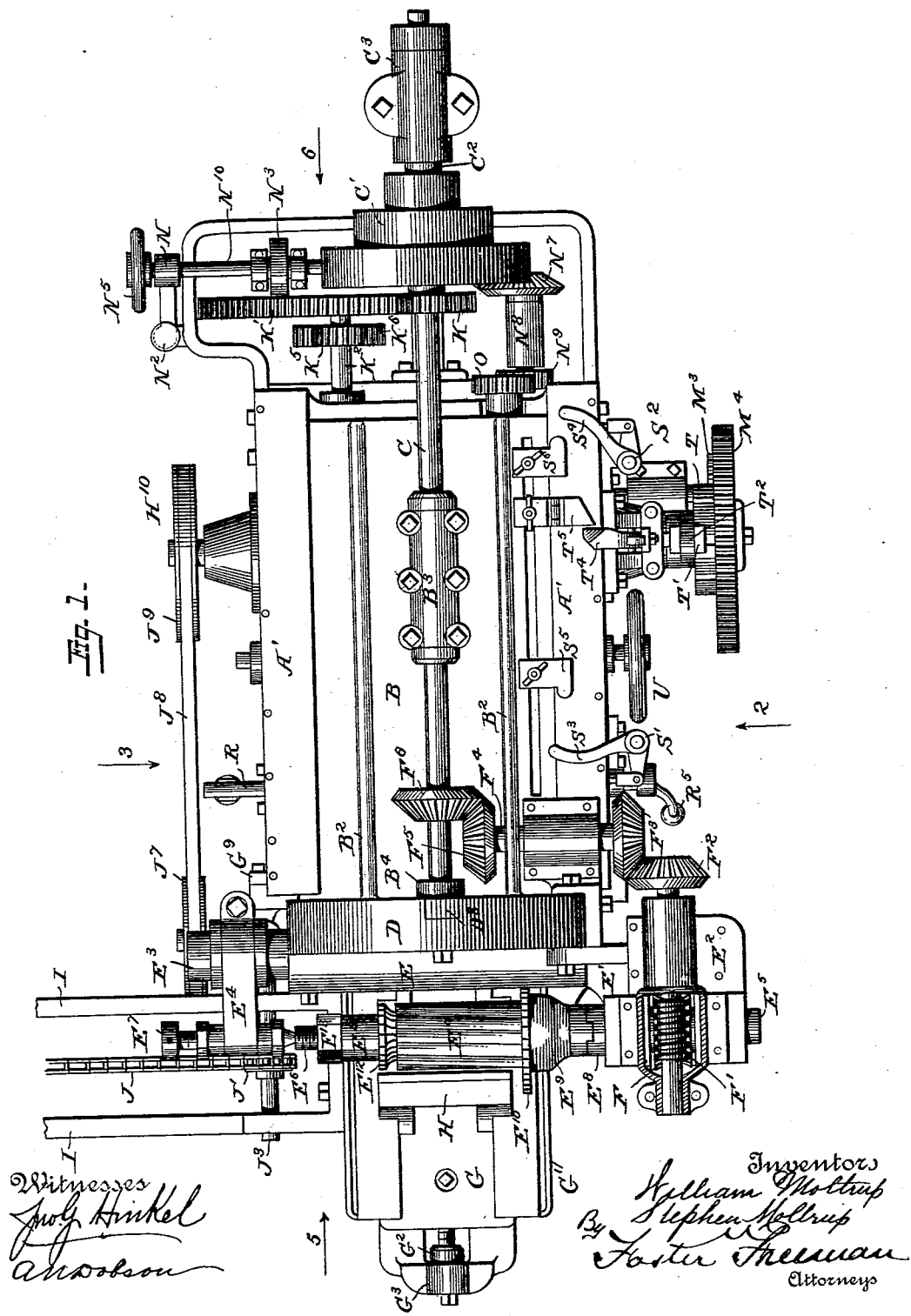
Figure 2:
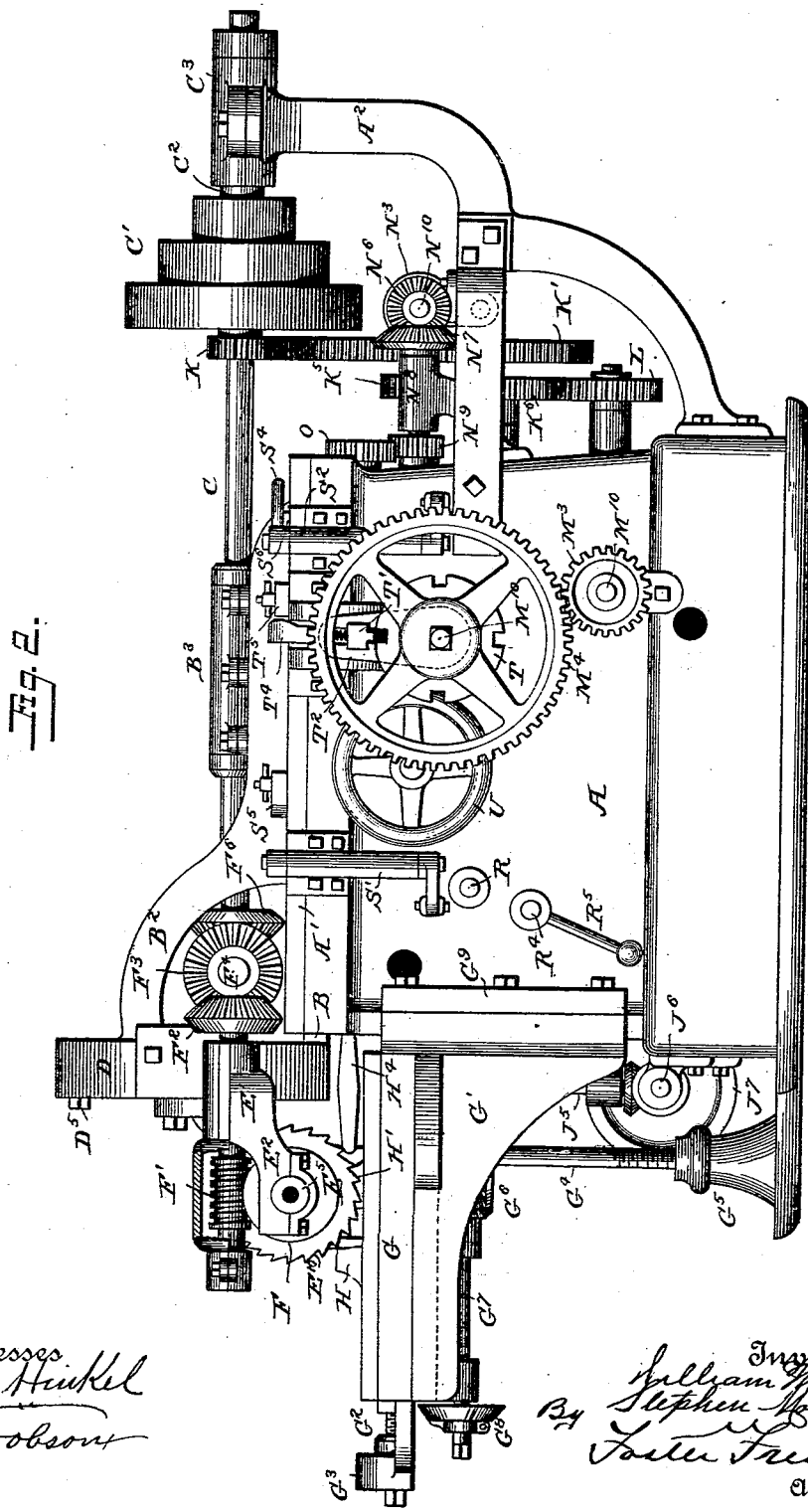
Figure 3:
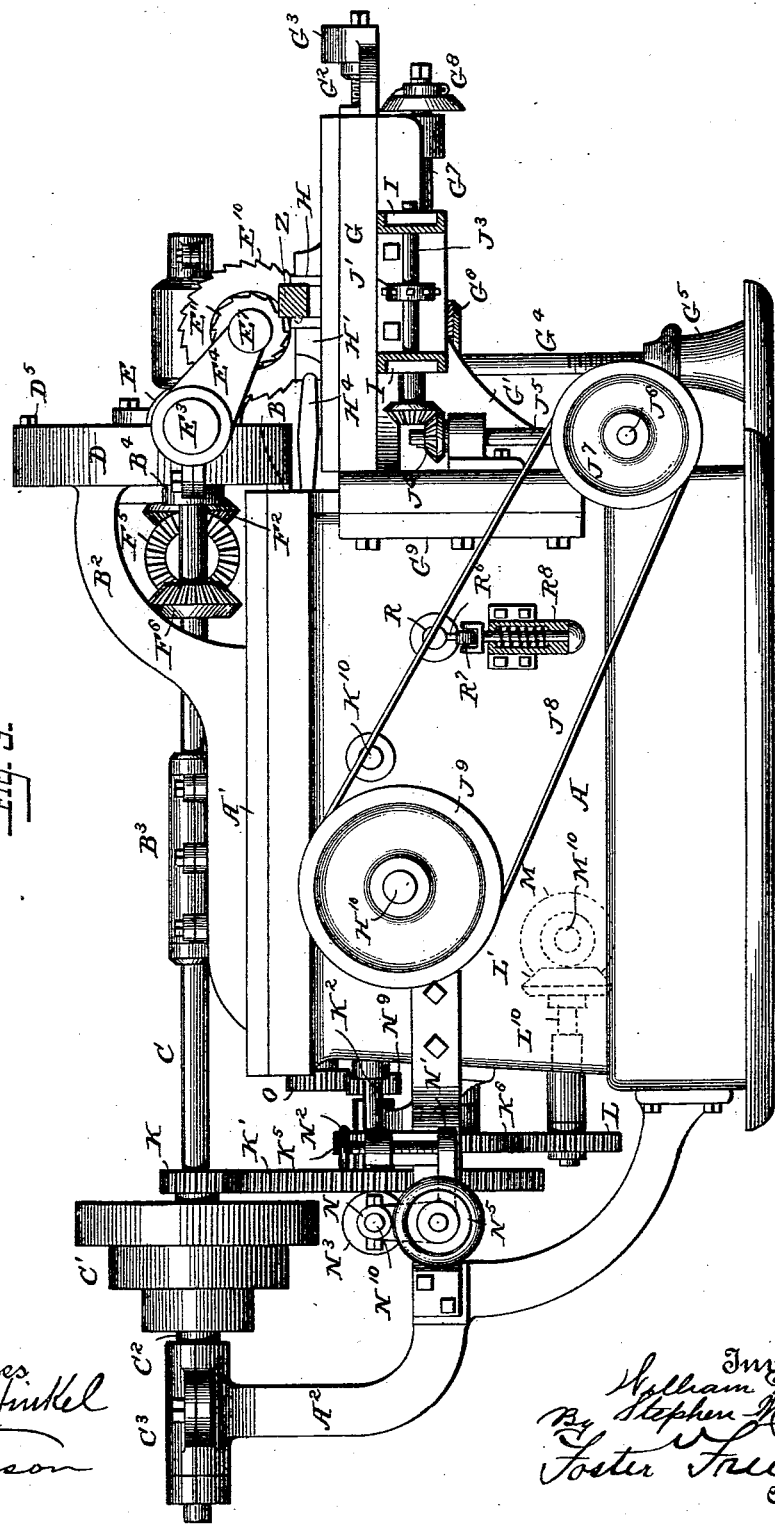
Figure 4:
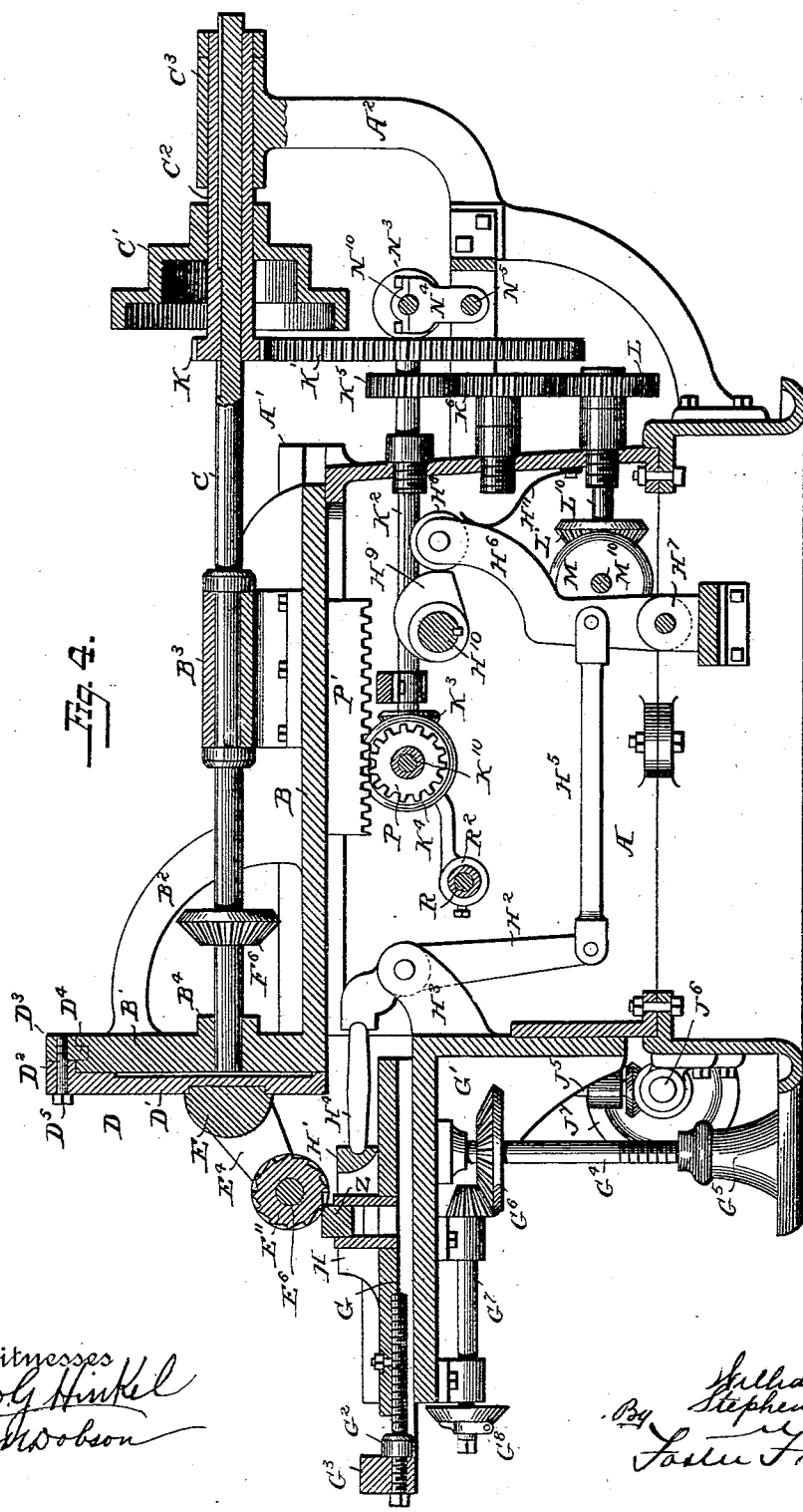
Figure 5:
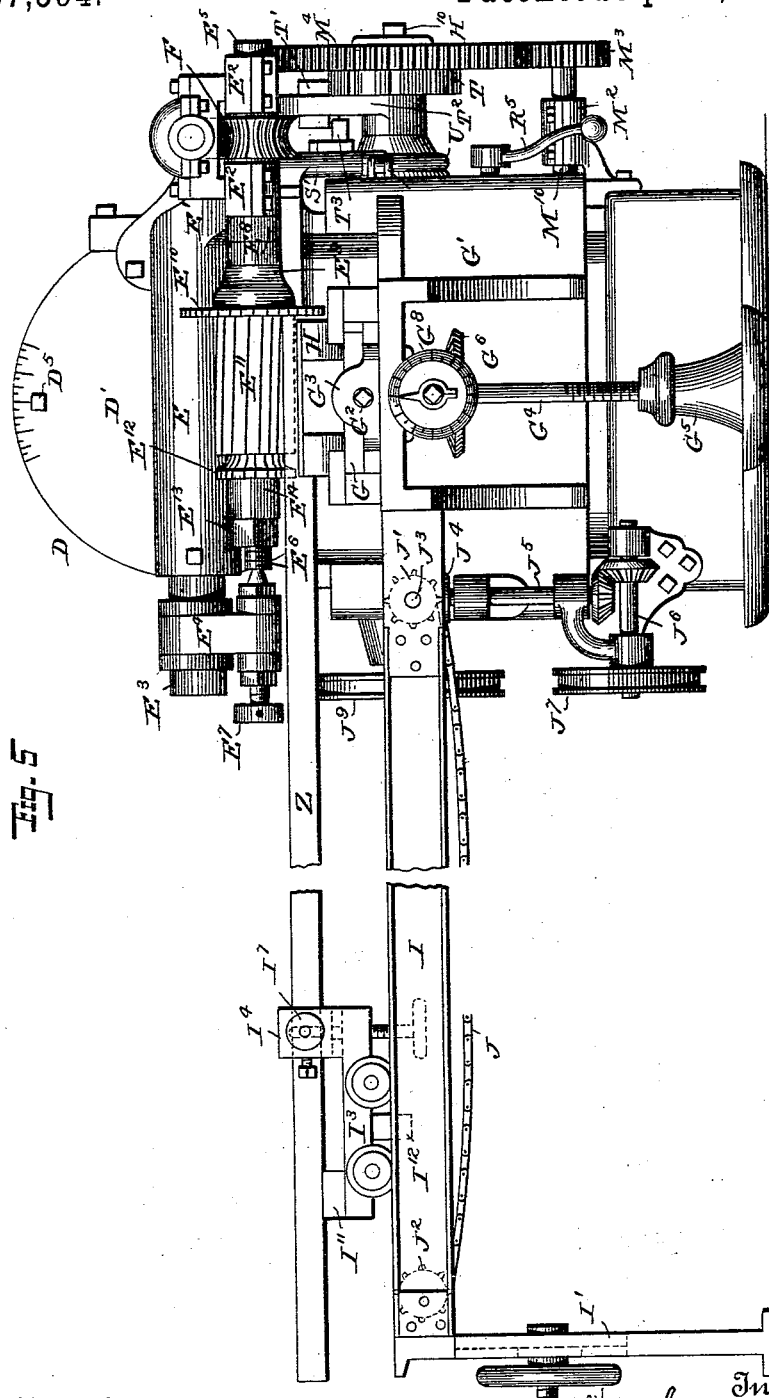
Figure 6:
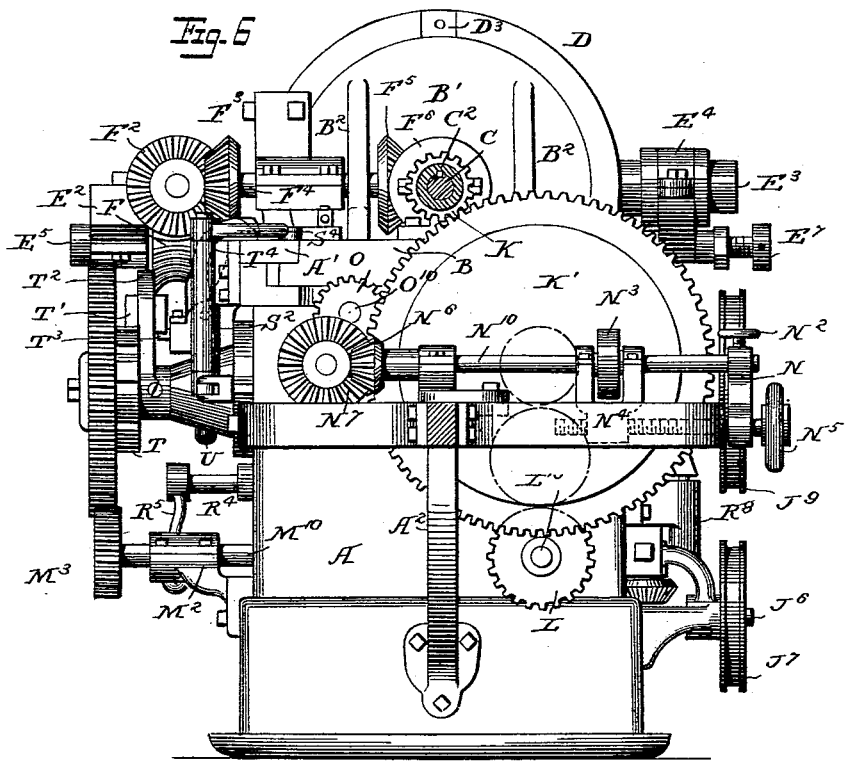
Figure 7:
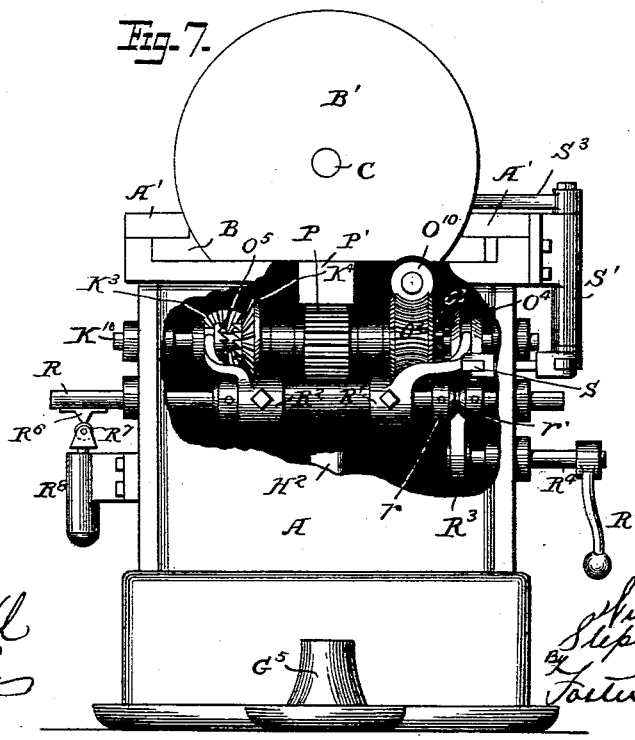
Figure 8:
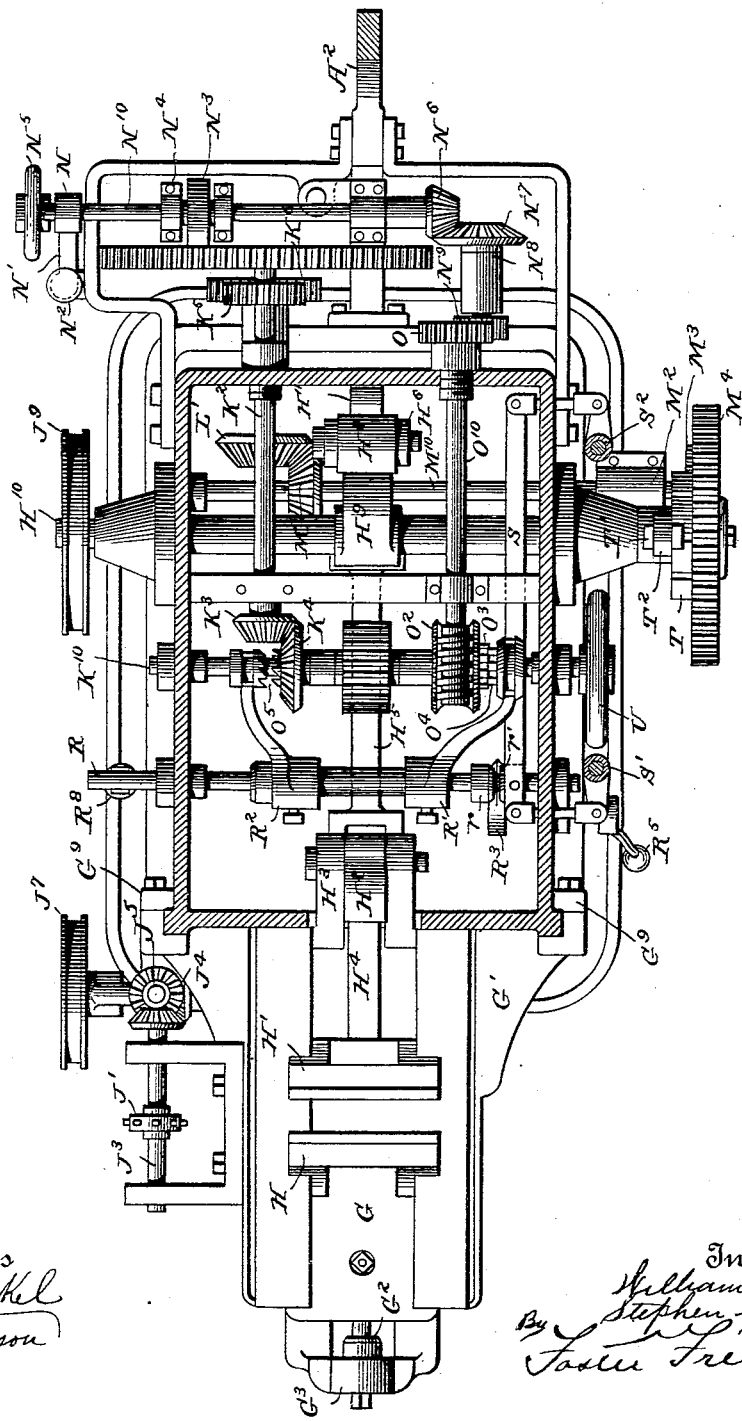

Referring to the accompanying drawings, Figure 1 is a plan view of a machine embodying the various features of our invention designed especially for milling keys. Fig. 2 is a front side view of the same. Fig. 3 is a rear or opposite side view. Fig. 4 is a longitudinal vertical section. Fig. 5 is a front end view. Fig. 6 is a rear view, the driving-gear being omitted. Fig. 7 is a detail showing the clutch mechanism. Fig. 8 is a horizontal section of the machine, taken below the carriage, showing the means for operating. Fig. 9 is a sectional view of the cutter-spindle. Fig. 10 is an enlarged view of the latch-wheel and connections. Fig. 11 is an enlarged end view, partly in section, of the stock-truck clamp.

As above intimated, the objects of our invention are not only to provide a complete machine embodying the various features of our invention which shall be specially applicable for milling keys, &c., but at the same time to provide improved mechanisms, which, while they are specially applicable to a machine of this class, are also applicable to other machines for milling and other purposes.

While we have shown our invention as embodied in a practical key-milling machine, it will be understood that we do not limit ourselves to the precise construction, arrangement, and mode of operation herein set forth, nor to the use of the different features of our invention together in one machine, as these may be varied by those skilled in the art without departing from the spirit of our invention.

In order that our invention may be clearly understood, we will now proceed to describe it as embodied in a machine illustrated in the drawings.

The machine comprises a suitable frame or casing A, to which the various parts are attached, and this frame or casing is preferably made of iron, so as to be solid and substantial, and to furnish a proper support for the operating mechanism, and to maintain them in proper relations, and while we have shown it as a casing substantially inclosing many of the parts and supporting the others it will be evident that it may be differently arranged, the only requisite being that it furnish a proper foundation for the other portions of the machine.

The top of the frame is formed to provide a guide or way in which moves a carriage or ram carrying some of the operating mechanism, and we have shown it as provided with guides A', in which is reciprocated the carriage B, shown in the present instance as a plate moving in the guides or ways, and having fixed thereto, or preferably formed therewith, a vertical transverse guide-plate B', and this may be provided with strengthening ribs or braces $B^2$. Mounted on the carriage is a bearing $B^3$, in which is supported the driving-shaft C, the forward end of which also has a bearing $B^4$ in the guide-plate B', and this shaft moves with the carriage and is driven by some suitable means, as the cone-pulley C', which is shown in the present instance as mounted on the sleeve $C^2$, which embraces the shaft C and is splined thereto, so as to permit the shaft to slide through the sleeve, but to be rotated thereby, and this sleeve is mounted in stationary bearings $C^3$, shown in the present instance as supported on a bracket-arm $A^2$, connected to the frame or case of the machine. It will thus be seen that the carriage and the shaft can reciprocate longitudinally, and that the shaft is given a rotary motion through the medium of the pulley and sleeve in whatever position it may be, and motion is imparted to the mechanism hereinafter described from this main driving wheel or pulley $C'$.

In the present embodiment of our invention it is desirable that the keys or other devices may be cut with beveled or tapered sides, or otherwise shaped to suit the particular requirements of the case, and in order that this may be done, and the cutters or milling-tools be properly adjusted to do the work, we mount on the guide-plate $B'$ a carrier $D$, and this carrier is shown as having a face-plate $D'$ conforming substantially to the outline of the guide-plate $B'$, and having a flange $D^2$ fitting over the outer edge of the guide-plate $B'$, which is preferably substantially circular in form. In order to adjustably secure this carrier to the face of the guide-plate, we provide a ring $D^3$, preferably having an internally-projecting flange $D^4$ fitting in a groove in the periphery of the guide-plate $B'$, and this ring and the carrier $D$ can be connected together by any suitable means, as the screw or bolt $D^5$, whereby the carrier is adjusted and secured at any desired angle on the guide-plate, suitable scales or indicating-marks being preferably provided, as shown in Fig. 5, for facilitating the adjustment of the carrier. Mounted on this carrier $D$ is a support $E$, (shown in Fig. 4 as preferably having a half-round external surface and as fitting in a groove in the face of the carrier and secured thereto by suitable bolts or otherwise,) and this support is extended, as at $E'$, to form bearings for one end of the cutter-spindle and the driving mechanism therefor. Thus we have shown this end $E'$ as extending forward toward the end, and bifurcated so as to provide two bearings $E^2$ $E^2$, having suitable cap-plates on their under sides forming a cutter-spindle bearing, and supporting the worm-wheel between the bifurcated end, and also forming a bearing for the worm-shaft. The other end of the support is extended, as at $E^3$, and serves as a support for the clamp $E^4$, carrying the bearings for the center-pin for the shaft of the cutters.

While it is evident that various means may be applied to support the cutters, depending upon the character thereof and the purposes for which they are used, in the present instance we have shown the bifurcated portion $E^2$ of the support as carrying a sleeve $E^5$, to which is secured the worm-wheel for driving the cutter-spindle, and this sleeve is provided with a tapered bore for the reception of the tapered end of the cutter-spindle $E^6$, the other end of the spindle being supported by the center pin $E^7$. The end of the sleeve $E^5$ is provided with a collar $E^8$, either formed therewith or connected thereto, and constituting one member of the clutch, while the collar $E^9$ constitutes the other member of the clutch and fits over the cutter-spindle.

In the present instance, where it is desired to make keys we mount on the cutter-spindle a saw $E^{10}$, a milling-tool $E^{11}$, and another milling-cutter $E^{12}$, and while these may be secured to the center spindle in any way, as by feathers or otherwise, we prefer to mount them loosely on the cutter-spindle and secure them by clamping, as by a nut $E^{13}$, suitable collars, as $E^{14}$, being supplied to regulate the position of the cutters and fill up the intervening spaces between the clamping devices and cutters. It will thus be seen that the cutter-spindle carrying the various cutters can be readily removed from the support, it only being necessary to release the center pin $E^7$ and to loosen the clamp $E^4$ when the bearing of the center pin can be moved out of the way and the center spindle can be drawn laterally from its tapered socket, and the cutting-tools removed or adjusted as may be required.

In order to give motion to the cutting-spindle carrying the cutter-tool, we have shown the worm-wheel $F$ as mounted on the sleeve $E^5$, and this is driven by the worm $F'$, mounted on the support, and this in turn is rotated by the beveled gears $F^2$ $F^3$, the latter of which is secured to a shaft $F^4$, mounted on the carriage $B$ and provided with a beveled gear $F^5$, engaging a similar gear $F^6$ on the driving-shaft $C$. It will be understood, of course, that the speed of rotation of the cutters can be varied by changing the relative size of the last-named beveled gears.

It will further be seen that the cutters, driving-gear, their supports and carriers are all mounted on the reciprocating carriage $B$ and move therewith, and that the angle or inclination of the cutters can be arranged and adjusted on the carriage, so that any desired bevel or other cut can be made as the cutters reciprocate to and fro.

The material to be operated upon is arranged to be supported on the proper table below the cutters, and in order to secure it positively while it is being cut we provide a suitable chuck or vise, which is operated automatically and which clamps the material and holds it beneath the cutters. The material is also automatically fed, so that as the articles are made, as in this instance the keys, and are cut off, the bars or rods are fed forward a sufficient distance to furnish material for other keys, and while various means may be used for this purpose we will now describe the devices shown in the drawings.

Adjustably secured to the frame $A$ of the machine is a table $G$, and this is shown as mounted on an adjustable bracket $G'$, and this table preferably slides in grooved bearings on the bracket, and the relations of the table to the bracket can be adjusted by any suitable means, as the screw $G^2$, passing through an extension $G^3$ of the bracket and engaging the table. Furthermore, the bracket can be adjusted vertically by any suitable means, and in this instance we have shown a vertical screw-shaft $G^4$ stepped at its lower end in a tapped socket secured to an extension of the frame or casing A, and having its upper end stepped into the under side of the bracket $G'$. The upper end is also provided with suitable gears $G^6$, which mesh with the bevel pinion which is operated by an adjusting device $G^7$, preferably having an indicator $G^8$, so that the height of the bracket and table mounted thereon with relation to the cutters can be accurately adjusted to suit the various devices being cut, and when adjusted, if desired, the bracket can be secured in position by the cap-screw or bolts $G^9$.

Mounted on the table is the chuck or vise, and this we have shown as comprising a stationary jaw H, which is mounted upon the adjustable portion of the table G, and a movable jaw $H'$, which is mounted upon the moving portion of the table G, and both portions of the table are fitted in the guideways of the bracket. In order to operate the movable jaw $H'$, we have provided a compound lever, consisting, essentially, of an arm $H^2$ fulcrumed near its upper end in a projection $H^3$, forming part of the bracket $G'$, and having a bar $H^4$ extending between its short arm and the movable jaw $H'$. The lower end of this arm is connected by the rod $H^5$ to the arm $H^6$, which is shown as pivotally mounted in bearings $H^7$, secured to the base or frame of the machine. The upper end of this is preferably provided with a friction-roll $H^8$, against which bears a cam $H^9$, mounted on a shaft $H^{10}$, the arm being held in contact with the cam by any suitable means, as the spring $H^{11}$, so as to follow the movement of the cam. It will thus be seen that by the use of this compound lever we are enabled to secure an exceedingly strong grip upon the material held in the chuck or vise, so that it is incapable of moving in the slightest degree while being operated upon by the cutters, and at the proper time on the rotation of the cam the chuck or vise is opened, releasing the material, allowing the complete article to be removed from the machine or to be fed outward, and new material to take its place, which is again clamped, as before.

While various means may be provided for supplying the material from which the articles are made to the machine, in the case of making keys we prefer to make use of rods or bars, one or more, as the case may be, and to provide means whereby they may be automatically fed into the machine to receive the milling and cutting operations. Thus we have shown as connected to the adjustable bracket $G'$ and extending laterally a table or frame I, it being supported at one end on the bracket $G'$, and the other end being preferably supplied with means for supporting it on a level, and we have shown the legs or standards $I'$ as being made in two parts, sliding one upon the other, and clamped by a suitable clamp-screw $I^2$. Mounted on this table or frame is a stock-carrying truck $I^3$, which is provided with a clamp $I^4$ of any suitable construction, and we have shown the preferred construction of it in detail in Figs. 5 and 11, and it will be seen that the truck-body is provided with uprights $I^5$, having recesses therein in which slide-blocks $I^6$ and side-adjusting screws $I^7$ pass through these blocks and clamp the rods sidewise, the block permitting the screws to be moved upward or downward, as may be desired, the openings $I^8$ for the screws being elongated.

In order to permit a nice adjustment to the height of the rods or bars, we also provide a movable platform $I^9$, which is adjusted by screws $I^{10}$, and in this way the bars are tightly held in position on the truck, while the block $I^{11}$ may be placed under the rear ends to further aid in supporting them, if desired. In order to move this truck to feed the stock into the machine at the proper time, we provide a chain J, which passes over the sprocket-wheels $J'$ $J^2$, mounted in the table or frame, and is connected to the truck in any suitable way, the truck being shown as provided with an extension $I^{12}$, having a slot $I^{13}$, through which the sprocket-chain passes, and a screw or pin $I^{14}$ passes through one of the links of the sprocket-chain and secures the truck to the chain, so that it will move accurately therewith.

The means for driving the sprocket-chain may of course be varied; but we have shown the sprocket-wheel $J'$ mounted on a shaft $J^3$, having beveled gears $J^4$, connected to an upright shaft $J^5$, which in turn is connected by the beveled gears to a transverse shaft $J^6$, having a belt wheel or pulley $J^7$ on its end, and this is driven by a belt $J^8$, passing around the pulley $J^9$ on the shaft $H^{10}$.

It is well known in milling and similar operations that the cutters must be fed forward at a comparatively slow speed, in order that they may properly operate upon the articles being cut, and we have provided means whereby this may be done, and at the same time we have also provided means whereby the cutters and the carriage may be returned to their normal position by a quick movement, and during this return the vise is loosened, the finished articles removed from the vise, and the stock or bars automatically fed forward a proper distance into the vise, ready to be clamped and operated upon, and all these operations are automatically performed, so that when the machine is operating it is only necessary for the attendant to supply new stock to the stock-truck to keep the machine running. While various mechanisms may be used to accomplish these results, we will now describe those we have embodied in this machine.

As before intimated, power is applied to the pulley C', and thence to the shaft C, for the purpose of operating the cutters, and mounted on or forming a part of the sleeve $C^2$ is a spur-gear K, which engages with a spur-wheel $K^7$, mounted on the shaft $K^2$, supported in the frame of the machine, and this shaft is provided with a beveled gear $K^3$, engaging with a similar gear $K^4$, loosely mounted on the transverse shaft $K^{10}$, and this bevel-gear is constantly rotated. Also mounted on the shaft $K^2$ is a smaller spur-gear $K^5$, and this engages with an idle-gear $K^6$, which in turn meshes with a gear L on the shaft $L^{10}$, mounted in the lower portion of the frame of the machine, and on this shaft is a bevel-gear L', engaging a similar bevel-gear M, mounted on the transverse shaft $M^{10}$, which is supported in bearings $M^2$ on a bracket connected to the outside of the frame A and carries a pinion $M^3$, engaging the latch-wheel $M^4$, loosely mounted on the shaft $H^{10}$ and constantly rotated when the machine is in operation. It will thus be seen that when in normal operation the cutters are rotated continuously, and there are two shafts also under continuous operation, by connection with which the reciprocation of the carriage can be accomplished and the material fed into the machine; and we will now describe the means we have employed whereby a slow progressive movement can be given to the carriage while the cutters are operating and a quick return movement will restore the carriage to its normal position at the rear end of the machine.

As it is necessary to vary the feed of the cutters, depending upon the nature of the work to be done, we so arrange the parts that a variable feed can be given to the carriage and connected mechanism, and to do this we use the face of the spur-wheel K' as a friction driving-wheel and mount on the frame a shaft $N^{10}$ in suitable bearings, one of which, as N, is L-shaped and pivoted at N', and operated by a screw $N^2$ to vary the relation of the shaft with the face of the friction-wheel K'. Mounted on the shaft $N^{10}$ is a friction-wheel $N^3$, running on the face of the friction-wheel K', and this wheel is splined or otherwise secured to the shaft $N^{10}$, so that it is free to move longitudinally thereon, but rotates therewith, and in order to adjust the position of this friction-wheel $N^3$ with relation to the driving friction-wheel we provide a yoke $N^4$, sliding on the shaft $N^{10}$ and moving the wheel $N^3$, and made adjustable by a hand-wheel $N^5$, so that a greater or less speed may be imparted to the friction-wheel $N^3$, according as it is nearer to or farther from the periphery of the friction-wheel K'. Also mounted on the shaft $N^{10}$ is a beveled gear $N^6$, engaging a similar gear $N^7$ on a counter-shaft mounted in bearings $N^8$ and provided with a gear $N^9$, engaging a gear O on the worm-shaft $O^{10}$. This worm-shaft engages a worm-wheel $O^2$, which is loosely mounted on a shaft $K^{10}$ and carries one member of a clutch $O^3$, the other member of this clutch, $O^4$, being splined or otherwise secured to the shaft $K^{10}$. Also mounted to rotate with the shaft $K^{10}$ is the pinion P, engaging a rack P' on the under side of the carriage B, and it will thus be seen that as the worm-wheel is rotated by the friction mechanism and connecting-gears the carriage is fed forward progressively at a comparatively slow speed while the cutting operations are being performed. In order to produce a quick return, the beveled gear $K^4$, which has been constantly rotating loosely on the shaft $K^{10}$, is connected by means of a clutch $O^5$ with said shaft, and this will cause the pinion P to move the carriage backward at a rapid rate, it being understood that while this operation is being performed the clutch $O^4$ is out of engagement with the worm-wheel. In order to make these movements automatic and have the clutches operate in harmony with each other, we provide a rod R, extending transversely of the machine, and mount thereon the arms R' $R^2$, which are arranged to extend the one into one member of the clutch of the worm-wheel, as $O^4$, and the other into the one member of the clutch of the return movement, as $O^5$. It will thus be seen that when this rod is moved to the one side or the other one clutch will be in engagement while the other will be thrown out.

As sometimes it is desirable to stop the mechanism without shifting the driving-power, we have shown a means whereby this may be done, and we have mounted on the rod R two collars $r$ $r'$, having beveled faces, and we provide an eccentric or cam $R^3$, mounted on a shaft $R^4$, provided with a suitable handle $R^5$, by means of which it may be operated and thrown into engagement between the stops and hold the clutch-operating rod R in a midway position, so that neither of the clutches will be in engagement, and the feed will be stopped. In order to shift these clutches automatically and provide for moving the carriage to a greater or less degree, we connect the shaft R with some suitable shifting mechanism, and we have shown a bar or rod S, secured in the present instance to one of the collars, as $r'$, and this is connected by suitable levers S' $S^2$, mounted on the side of the machine, and having arms $S^3$ $S^4$ extending over the top of the frame. Adjustably mounted on the carriage C are the tappets $S^5$ $S^6$, and these extend in the path of the arms $S^3$ $S^4$, and as the carriage reaches the end of its reciprocation in either direction one or the other of the tappets impinges against the corresponding arm, shifts the rod R, and thereby throws the corresponding clutches into and out of engagement with the driving devices.

In order to insure the engagement of the clutches at either end of the reciprocation of the table, we provide a V-shaped bearing $R^6$ on the rod R, and arranged in contact therewith is a friction-roller $R^7$, supported on a spring mounted in the bearing $R^8$, and this is arranged so that when both clutches are out the spring will be depressed, but when the rod R is moved slightly past the central position the spring-actuated roller acting on the incline will throw the rod completely over, insuring a proper engagement and disengagement of the clutch mechanism.

In order to operate the vise to release the finished articles and the feeding mechanism, to supply the stock from which the articles are made, and to clamp it in the vise, we make use of an intermittently-operating clutch mechanism, which we have shown as including a latch-wheel T, connected to and rotating with the gear-wheel $M^4$. Supported above this latch-wheel is the latch T', which is carried in a latch-arm $T^2$ fast on the shaft $H^{10}$, and is normally held out of engagement with the latch-wheel by a catch $T^3$, and this is connected to a lever $T^4$, the upper end of which is beveled and projects inward over the upper edge of the frame within the path of the break-joint ear $T^5$, which is adjustably mounted on the carriage C.

In the normal position it will be seen that the latch T' is held out of engagement with the latch-wheel, and as the carriage passes forward the break-joint ear $T^5$ rides over the projecting end of the lever $T^4$ without affecting it, but as the carriage returns the beveled end of the break-joint ear impinges against the beveled surface of the projecting end of the lever and withdraws the catch $T^3$, allowing the latch to drop into one of the notches on the latch-wheel, thereby connecting the shaft $H^{10}$ to the wheel, and it is thereby rotated. As soon as the break-joint ear has passed the lever $T^4$ it assumes its normal position, being pressed by a spring $T^6$, and as the latch-arm rotates and completes its rotation the latch rides up the beveled face of the catch $T^3$, and is thereby disengaged from the latch-wheel.

It will be seen that as the shaft $H^{10}$ rotates the cam $H^9$ is operated, allowing the compound lever to release the vise, and at the same time the pulley $J^9$ is rotated, and, through its connecting mechanism, feeds the stock-truck forward a sufficient distance to supply new material to be operated upon and discharges the completed article, and the cam $H^9$ then operates to close the vise and secure the material in place.

As sometimes it is desirable to move the carriage and its appurtenances more or less in adjusting the devices, we provide a hand-wheel U, mounted on the shaft $K^{10}$, so that the parts may be adjusted back and forth.

From the above the general construction of our device will be understood, and its mode of operation will be apparent without further description, and it will be seen that all of the operations are automatic and are positive in their nature, and that the articles can be made and discharged from the machine in their finished condition at a rapid rate, the movements of the parts when the cutting devices are out of operation being quickened, while at the same time the cutter can be fed progressively at a proper speed.

It will be understood that various articles can be made on this machine, and we have shown it arranged to finish a steel key, the outlines of the key being shown at Z, Fig. 5, and these keys are made from rods of steel, preferably cold drawn, the milling-cutter $E^{11}$ being of a shape to bevel one side of the key, while the milling-cutter $E^{12}$ is of a shape to bevel the end of the key, and while these operations are being performed the saw $E^{10}$ severs the previously-made keys from the stock and allows them to be deposited in any suitable receptacle.

Having thus described the preferred embodiment of our invention and pointed out the distinguishing characteristics thereof in a general way, without limiting ourselves to the details, we claim as our invention the following:

1. The combination with the frame, of a reciprocating carriage, a vertical guide-plate, the carrier, the ring fitting the guide-plate, and means for connecting the carrier and ring for adjusting the carrier on the guide-plate, a support mounted on the carrier having extensions, a cutter-spindle mounted in the extensions, and means traveling with the carriage for propelling the cutter-spindle, substantially as described.

2. The combination with the carrier and support mounted thereon having extensions, one of the extensions being bifurcated, a bearing for the cutter-spindle mounted on the extension, a driving-gear for the cutter-spindle also mounted on the extension, and a bearing for the other end of the cutter-spindle mounted on the other extension of the support, substantially as described.

3. The combination with the support having extensions, one of the extensions being bifurcated and carrying a sleeve having a socket, a clutch portion fitted on the sleeve, a cutter-spindle mounted in the socket, a clutch portion mounted on the spindle, devices for holding the cutters and spindle, and a center bearing mounted on the other extension, and supporting one end of the spindle, substantially as described.

4. The combination with the frame, of a reciprocating carriage and milling-tools carried thereby, of a vise for holding the material, automatic mechanism for operating the vise, and automatic mechanism for feeding the material to the vise, substantially as described.

5. The combination with the frame, of a carriage and milling-tools carried thereon, automatic means for reciprocating the carriage, a vise for holding the material, automatic means for operating the vise, and feeding devices for feeding the material, and automatic means for operating the feeding material, substantially as described.

6. The combination with the frame, of a reciprocating carriage carrying the milling-tools, automatic means for reciprocating the carriage to give it a slow advance and a quick return, a vise for clamping the material, automatic means for operating the vise, and automatic feeding devices for the material, substantially as described.

7. In a milling-machine the combination with the cutters of means for automatically feeding the cutters forward at a slow speed and returning them at a rapid speed, means for automatically clamping the material while being cut, and means for automatically feeding the material to the clamps, substantially as described.

8. The combination with the frame, of a reciprocating carriage carrying milling-tools, means for propelling the carriage forward at a slow rate of speed, means for withdrawing the carriage at a higher speed, a clamp for holding the material, means for feeding the material to the clamp, and clutch mechanism controlled by the traveling carriage for controlling the operations of the clamping device and feeding mechanism, substantially as described.

9. The combination with the frame and a carriage mounted thereon carrying milling-tools, and means for operating the tools, of a worm-gear for moving the carriage forward, a variable friction device for propelling the worm-gear, a rack and pinion for giving a quick return to the carriage, and clutch mechanism controlled by the movements of the carriage and controlling the driving and return devices, substantially as described.

10. The combination with the frame and reciprocating carriage thereon carrying milling-tools, and means for operating them, of a worm-gear for moving the carriage forward, a variable friction device for operating the worm-gear, a rack and pinion for giving a quick return to the carriage, clutch mechanism controlling the worm-gear and rack and pinion, a clutch-operating rod, arms connected to the rod, and adjustable stops mounted on the carriage for operating the arms, substantially as described.

11. The combination with the frame and reciprocating carriage mounted thereon carrying milling-tools and means for operating them, of connections for giving a variable forward movement to the carriage, connections for giving a quick return to the carriage, connections controlled by the carriage for controlling the feed and return movements, a vise, automatic mechanism controlling the vise, automatic feeding devices for the material, and connections controlled by the reciprocating carriage for operating the vise and feeding devices, substantially as described.

12. The combination with the frame, of the reciprocating carriage thereon carrying milling-tools, and means for operating them, a vise for clamping the material, automatic means for operating the vise, automatic feeding devices for the material, a clutch mechanism controlling said automatic vise, operating and feeding devices, and an adjustable stop on the reciprocating carriage controlling the clutch mechanism, substantially as described.

13. The combination with the frame and the reciprocating carriage mounted thereon carrying milling-tools, and means for operating them, of automatic devices for feeding the carriage forward with a variable speed, automatic devices for giving a quick return to the carriage, a vise, and automatic means for operating the vise, a feeding device, and automatic means for operating the device, and adjustable stops mounted on the carriage controlling the feed and return of the carriage, and the operation of the vise and feeding devices, substantially as described.

14. The combination with the frame and reciprocating carriage mounted thereon carrying milling-tools, of means for operating the milling-tools, devices for feeding the carriage forward, comprising a friction-disk, a shaft, a friction-wheel mounted on the shaft, a yoke also sliding on said shaft and embracing the friction-wheel, and a screw connected to said yoke to control the position of said wheel with relation to said disk, substantially as described.

15. The combination with the reciprocating carriage and means for moving it forward and backward, of clutch mechanism controlling said means, a rod carrying arms controlling the clutch mechanism, collars on the rod, and an eccentric arranged to engage the collars and to maintain the rod in its midway position to disengage both clutches, substantially as described.

16. The combination with the reciprocating carriage carrying the milling-tools, of the vise for holding the material, the stock-truck for supporting and carrying the material to the vise, means for automatically operating the vise, and means for automatically feeding the stock-truck when the vise is opened, substantially as described.

17. The combination with the reciprocating carriage carrying milling-tools, of a vise for holding the material to be operated upon, a stock-truck supporting the material, clamping devices on the truck, sprocket-wheels and chains for moving the truck, automatic connections for moving the sprocket-wheels, and automatic connections for controlling the vise, substantially as described.

In testimony whereof we have signed our names to this specification in the presence of two subscribing witnesses.

WILLIAM MOLTRUP.
    STEPHEN MOLTRUP.

Witnesses:
 JAMES F. MERRIMAN,
 GEO. W. MORRISON.